H. C. Sergeant,
Governor.
Nº 22,380. Patented Dec. 21, 1858.
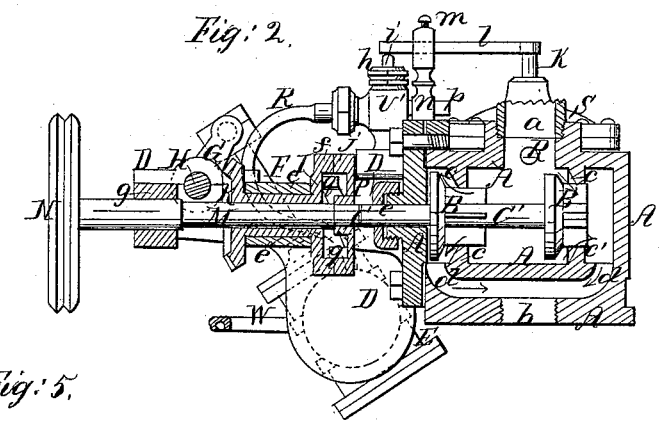
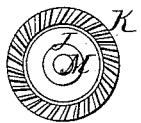
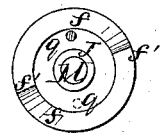
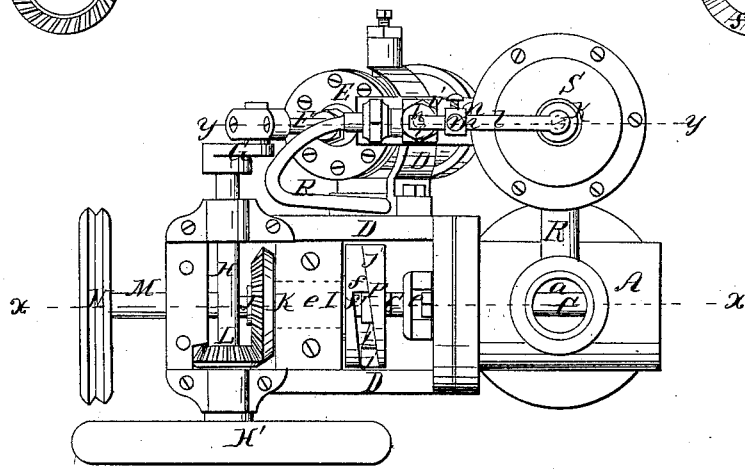
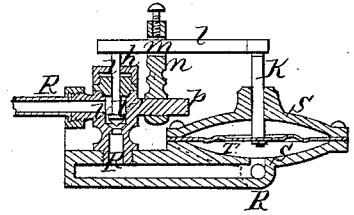

UNITED STATES PATENT OFFICE.

H. C. SERGEANT, OF COLUMBUS, OHIO.

GOVERNOR FOR STEAM-ENGINES.

Specification of Letters Patent No. 22,380, dated December 21, 1858.

*To all whom it may concern:*

Be it known that I, HENRY C. SERGEANT, of Columbus, in the county of Franklin and State of Ohio, have invented a new and Improved Governor for Marine and other Steam Engines; and I do hereby declare that the following is a full, clear, and exact description of the same, reference being had to the accompanying drawings, making part of this specification, in which—

Figure 1 is a plan view representing my improved governor, with its regulating valve in condition for application to a steam-engine. Fig. 2 is a vertical section of the same; in the plane indicated by the line $x, x$, in Fig. 1. Fig. 3 is a vertical section, in the plane indicated by the line $y, y$, of a regulating apparatus, by which the pressure of steam on the piston of the regulator engine is rendered uniform to insure its uniform velocity. Fig. 4 is a view representing, detached, a part of the mechanism by which the combined actions of the engine to be regulated and of the regulator engine are made to produce their effect on the regulating valve. Fig. 5 is a face view of one of the gears employed in the governor.

Similar letters of reference indicate corresponding parts in the several figures.

My improved governor consists of a smaller steam engine which works independently of the engine whose speed is to be governed and which is so applied as to drive certain mechanism which offers an unvarying resistance to its motion and is combined with mechanism driven by the engine to be governed, and in combination with the whole of the aforesaid mechanism is so applied to a regulating valve which controls the supply of steam to the last named engine that any variation in the load of that engine and consequent tendency to an increase or diminution of its velocity as compared with the velocity of the smaller engine, which may be termed the "regulator engine," causes the opening of the regulating valve to be diminished or increased in a proper degree to overcome such tendency and cause the velocity of the large engine to be always (notwithstanding the greatest variation in the load upon it) in exact proportion to that of the smaller engine, which latter velocity can be controlled without any difficulty.

To enable those skilled in the art to make and use my invention, I will proceed to describe its construction and operation.

A is the box which contains the regulating valve, having an inlet $a$, to which is connected the steam pipe of the engine to be regulated, which, for the sake of distinction, may be termed the main engine, and an outlet $b$, which serves as a communication with the valve chest of said engine.

B, B′, represent the two heads of a double puppet valve, which is the kind of valve I prefer to use to regulate the supply of steam, said heads both being secured to the same stem C, and fitting to two seats $c$, $c'$, within the box A. The inlet $a$, of said box is between the two valve seats $c$, $c'$, and the outlet has two branches $d$, $d$, which communicate with the box between its ends and the valve seats. The valve steam C, projects through a stuffing box $e$, at one end of the box A, and the head B is made just so much larger than that B′, as is sufficient to cause the minimum pressure of the steam in the steam pipe, by its action on the excess of area on that head, to overcome the friction on the valves and their stem and keep the valves as far open as is permitted by the mechanism which is employed outside of the box A, to control the opening of the valve.

D, D, is the framing; E, the cylinder; F, the piston-rod; G, the crank; H, the crank shaft; H′, the fly wheel; and W, the exhaust pipe, of the regulator engine, which is of the high pressure kind and may be of any form, either reciprocating or rotary; but I have represented it as having an oscillating cylinder. This engine needs no particular description as it may be constructed and fitted up in any well known manner. Its framing D, D, is bolted to the valve box A, for the convenience of attaching the entire governor and valve at once to a steam engine. The area of the piston need not be more than about one-sixtieth (1/60) that of the piston of the engine to be governed.

R, is the steam pipe which supplies steam to the regulator engine from the valve chest A; the steam for this purpose being taken from the inlet side of the regulating valve B, B′. U, (Fig. 3) is a conical valve in the said pipe for regulating the pressure of the steam supplied to the regulator engine and causing a uniform pressure upon the piston of the said engine; and S, T, $k$, $l$, $m$, is a regulator for controlling the opening of the valve U. The valve U, is of the puppet kind and arranged in a box U′, in the top of which is a stuffing box $h$, through which the stem $i$, of the valve passes. The regulator consists of a box S, containing a flexible diaphragm T, many times larger than the valve U, made of a corrugated steel or brass plate, and having communication with the steam pipe R, below the diaphragm, and the said diaphragm has secured to it a rod R, which passes through a hole in the top of the box, and constitutes a bearing for one end of a lever $l$, the other end of which bears on the valve stem $i$. The fulcrum of this lever is the point of a screw $m$, which screws into the top of an upright piece of metal $n$, which is attached to an arm $p$, standing out from the valve-box. The pressure of the steam upon the valve U opens it, but the amount of its opening is regulated by the pressure upon the diaphragm T, which exerts a tendency to push up the rod $k$, against the lever $l$, and to thus cause said lever to force down the valve stem, and contract the opening of the valve. The greater the pressure of the steam the greater will this tendency be, and vice versa, and if the distances of the stem $i$, and rod $k$, from the fulcrum $m$, are properly proportioned, the opening of the valve will be in the inverse ratio as the pressure of steam entering the pipe R; and hence the pressure on the piston of the regulating engine will be always uniform. To provide for the adjustment of the fulcrum to the proper distance from $k$, and $i$, the piece $n$, is made movable on the arm $p$.

J, is a hollow shaft fitted to rotate but not permitted to move longitudinally in a bearing $e$, in the framing D, D. This shaft has its axis in line with the axis of the valve stem C, and has secured to one end a bevel gear K, gearing with a bevel gear L, on the crank shaft of the regulator engine, and has at the other end a disk I, on the face of which and facing the end of the valve stem C, are two similar semi-circular spiral projections $f$, $f$, which are equivalent to wedges or portions of screw threads. Fig. 4 is a face view of this disk I. As the shafts H and J cross each other, the teeth of the gear K must be cut tangentially to a circle described from the axis of the shaft, J, as shown in Fig. 5, so that the teeth of the gear L, which are cut like those of ordinary bevel gearing, may have a proper bearing against them.

M is a shaft passing through the hollow shaft J, which constitutes one of its bearings, and fitting to another bearing $g$, in the framing D, D. This shaft, which is fitted to its bearings so as to be capable of moving longitudinally therein, has fast at one end a pulley N, to receive a driving band running from a pulley on the shaft of the engine to be regulated; and near the other end it has a disk P, like the disk I, having two circular spiral or wedge-like projections $j$, $j$, which resemble those $f$, $f$, on disk I, and are intended to work in contact therewith.

$q$, $q$, are stop pins attached one to each of the disks I, P, to prevent the wedge-like projections $f$, $f$, and $j$, $j$, rotating too far. The end of the shaft M is intended to be in contact with the outer end of the stem C, of the regulating valve when said valve is open.

The operation of the governor is as follows:—Steam admitted to the valve box A, presses open the valve B, B', and passes through the outlet $b$, to the main engine, as well as through the pipe R to the regulator engine and sets both in motion; and while the main engine gives rotary motion to the shaft M, and disk P, the regulator engine gives rotary motion to the disk I, in the same direction. The regulator engine meeting only with the resistance due to the friction of its parts, which is at all times the same, and occasionally a slight resistance due to the friction of the surfaces of $f$, $f$, and $j$, $j$, which is scarcely appreciable, and the pressure of steam on its piston being rendered uniform by the action of the regulator S, T, $k$, $l$, $m$, on the valve U, there will never be any appreciable variation in its velocity. The pressure of the steam against the larger area of the head B, of the main regulating valve B, B', will keep the stem C, of the said valve in contact with the end of the shaft M, which will keep the said valve B, B', less or more open according as there is a tendency of the disk P, driven by the main engine to rotate faster or slower than the disk I, driven by the regulator engine; for the slightest acceleration of the disk P will, by the action of the impinging spiral faces $j$, $j$, and $f$, $f$, upon each other, cause the disk P to be forced away from that I, and thus cause the shaft M to advance upon the valve stem C, and, by the movement thus imparted to the valve B, B', reduce the opening of said valve and the supply of steam to the main engine; and this action will continue till the speed of the disk P is reduced to that of the disk I, when the valve will become stationary. On the contrary, if there is any retardation of the disk P, it will be permitted to approach closer to I, and will thus permit the valve to open wider till the speed of the disk P again reaches that of I. It is obvious that the velocity of the regulator engine will control positively that of the main engine, even under the greatest possible variations of the load, and this it does without any visible variation in the velocity of that engine. To give the main engine the desired velocity, the fulcrum screw $m$, is screwed up or down to give the valve U, more or less opening, and thus give the regulator the required velocity.

Other contrivances might be employed in place of the disks I, and P, to combine the shafts J, and M, driven respectively by the regulator engine and the engine to be regulated; but said disks constructed with spiral projections $f$, $f$, and $j$, $j$, and stop pins $q$, $q$, possess advantages over other contrivances in the smoothness of their working, the regularity of their friction, and in the absence of liability to give the valve too great a motion. The motion of the valve is controlled by the stop pins $q$, $q$, and the shoulders $f'$, $f'$, and $j'$, $j'$; the stop pins being set to come in contact with each other just as the valve closes and thus to compel both disks to rotate together and prevent any further longitudinal motion the valve being jammed violently into its seat. The shoulders $f'$, $f'$, and $j'$, $j'$, act as stops to prevent the valve opening too far. Such disks may also be used in combination with any constant motor applied in a manner to operate like the regulating-engine as a regulator.

What I claim as new, and desire to secure by Letters Patent, is:—

1. A steam engine governor composed in part of a steam engine which is subject to a uniform resistance and which works independently of, and by its own velocity controls the velocity of the engine to be governed, substantially as herein set forth.

2. The employment of two disks I and N, having spiral projections $f$, $f$, and $j$, $j$, on their faces, and provided with stop pins $q$, $q$, applied substantially as described, to combine an engine which is to be regulated with an isochronous revolving regulator.

3. The combination of what is herein termed the "regulator-engine," its regulator S, T, $k$, $l$, $m$, and regulating valve U, or their equivalents, and the shafts H and M, and their spiral-faced disks I, P, one driven by said engine and the other by the engine to be governed; the whole applied and operating in combination with a regulating valve B B', or its equivalent, substantially as herein described.

H. C. SERGEANT.

Witnesses:
W. TUSCH,
W. HAUFF.